US008899685B2

(12) United States Patent
Haeske et al.

(10) Patent No.: US 8,899,685 B2
(45) Date of Patent: Dec. 2, 2014

(54) VEHICLE SEAT HEADREST ASSEMBLY HAVING VERTICAL AND LONGITUDINAL ADJUSTMENT

(71) Applicant: Porter Group, LLC, Novi, MI (US)

(72) Inventors: Robert L. Haeske, Milan (IT); Karl A. Murphy, Novi, MI (US); Edward H. Poulos, Grosse Ile, MI (US)

(73) Assignee: Porter Group, LLC, Novi, MI (US)

( * ) Notice: Subject to any disclaimer, the term of this patent is extended or adjusted under 35 U.S.C. 154(b) by 11 days.

(21) Appl. No.: 13/919,016

(22) Filed: Jun. 17, 2013

(65) Prior Publication Data

US 2014/0001811 A1    Jan. 2, 2014

Related U.S. Application Data

(60) Provisional application No. 61/664,902, filed on Jun. 27, 2012.

(51) Int. Cl.
*B60N 2/48*        (2006.01)
(52) U.S. Cl.
CPC ................... *B60N 2/4823* (2013.01)
USPC ......................................... 297/410; 297/404
(58) Field of Classification Search
USPC ................................................ 297/404, 410
See application file for complete search history.

(56) References Cited

U.S. PATENT DOCUMENTS

| 5,052,754 | A  | 10/1991 | Chinomi |
| 6,149,233 | A  | 11/2000 | Takei et al. |
| 6,213,548 | B1 | 4/2001  | Van Wynsberghe et al. |
| 6,533,359 | B1 | 3/2003  | Holstensson |
| 6,623,973 | B2 | 9/2003  | Schaefer et al. |
| 6,666,516 | B2 | 12/2003 | Grammss et al. |
| 6,688,697 | B2 | 2/2004  | Baumann et al. |
| 6,899,395 | B2 | 5/2005  | Yetukuri et al. |
| 6,983,995 | B1 | 1/2006  | Veine et al. |
| 7,073,856 | B2 | 7/2006  | Akaike et al. |
| 7,073,863 | B1 | 7/2006  | Low et al. |
| 7,232,187 | B1 | 6/2007  | Sundararajan et al. |
| 7,284,793 | B2 | 10/2007 | Kleuhspies et al. |

(Continued)

FOREIGN PATENT DOCUMENTS

WO        2011107852 A1        9/2011

OTHER PUBLICATIONS

PCT Transmittal of the International Search Report and The Written Opinion of the International Search Authority Dated Nov. 4, 2013, Application No. PCT/US2013/046066, Applicant Porter Group, LLC, 10 Pages.

*Primary Examiner* — Rodney B White
(74) *Attorney, Agent, or Firm* — Brooks Kushman P.C.

(57) ABSTRACT

A vehicle seat headrest assembly (20) includes a headrest (21) having a rear headrest portion (28) with a housing (29) mounted on vertical posts (26) for vertical movement and also includes a front headrest portion (30) having a housing (31) movable longitudinally in forward and rearward directions by a support linkage (46) under the control of a rack and pinion mechanism (62). A first helical spring locking clamp (44) permits upward adjusting movement of the headrest but normally prevents downward movement, and a second helical spring locking clamp (72) permits forward movement of the front headrest portion housing (29) while normally preventing rearward movement. An actuator (36) releases the first and second helical spring locking clamps (44 and 72) to permit downward movement of the headrest (21) and rearward adjustment of the front headrest portion (30) housing (31).

11 Claims, 12 Drawing Sheets

(56) References Cited

U.S. PATENT DOCUMENTS

| | | |
|---|---|---|
| 7,350,859 B2 | 4/2008 | Klukowski |
| 7,455,363 B2 | 11/2008 | Chung |
| 7,500,721 B2 | 3/2009 | Beroth et al. |
| 7,517,015 B2 | 4/2009 | Terada et al. |
| 7,520,564 B2 | 4/2009 | Woerner |
| 7,611,196 B2 | 11/2009 | Terada et al. |
| 7,618,091 B2 | 11/2009 | Akaike et al. |
| 7,631,932 B2 | 12/2009 | Hoffmann |
| 7,717,507 B2 | 5/2010 | Toda et al. |
| 7,766,423 B2 | 8/2010 | Alexander et al. |
| 7,770,967 B2 | 8/2010 | Hirota et al. |
| 7,866,745 B2 | 1/2011 | Hirota et al. |
| 7,871,129 B2 | 1/2011 | Boes et al. |
| 7,887,094 B2 | 2/2011 | Sakaida |
| 8,038,219 B2 | 10/2011 | Boes et al. |
| 8,616,633 B2 * | 12/2013 | Truckenbrodt et al. ... 297/404 X |
| 2004/0262974 A1 | 12/2004 | Terada et al. |
| 2007/0027599 A1 | 2/2007 | Sakai et al. |
| 2007/0246989 A1 | 10/2007 | Brockman |
| 2008/0100118 A1 | 5/2008 | Young et al. |
| 2009/0058162 A1 | 3/2009 | Boes et al. |
| 2009/0096468 A1 | 4/2009 | Hirota et al. |
| 2010/0026061 A1 | 2/2010 | McFalls et al. |
| 2010/0127541 A1 | 5/2010 | Kotz |
| 2010/0127548 A1 * | 5/2010 | Truckenbrodt et al. ....... 297/391 |
| 2010/0231023 A1 | 9/2010 | Wuerstlein et al. |
| 2010/0283306 A1 | 11/2010 | Boes et al. |
| 2011/0109143 A1 | 5/2011 | Maddelein et al. |

* cited by examiner

FIG. 2

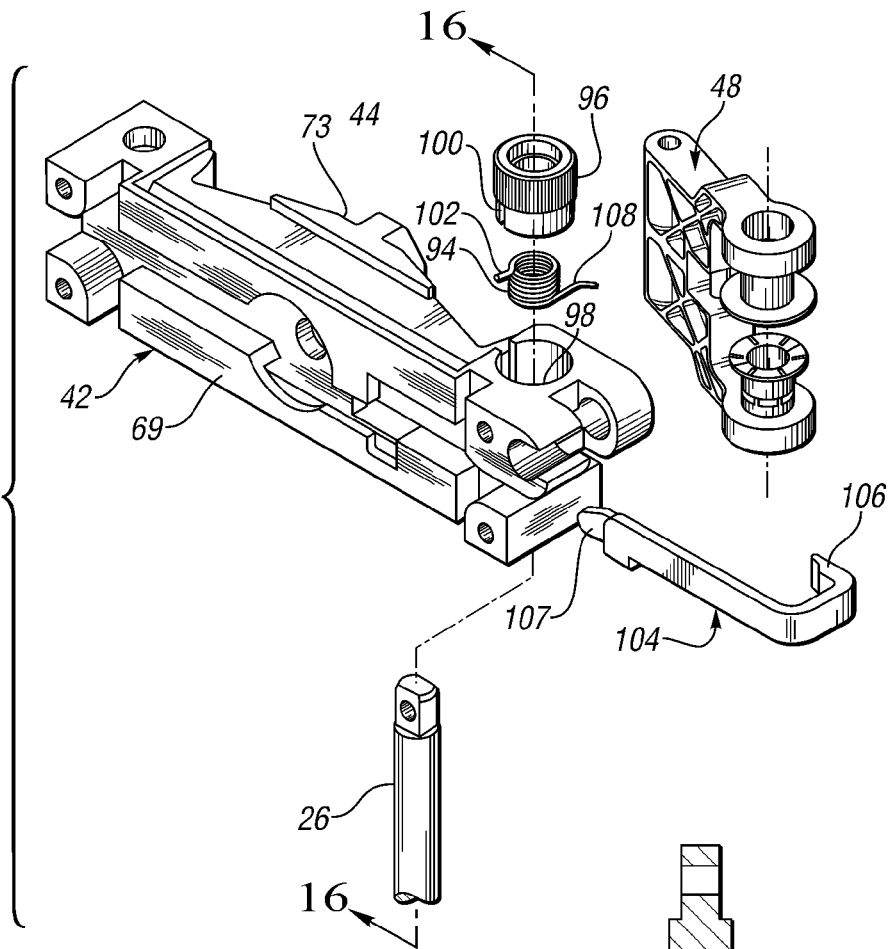
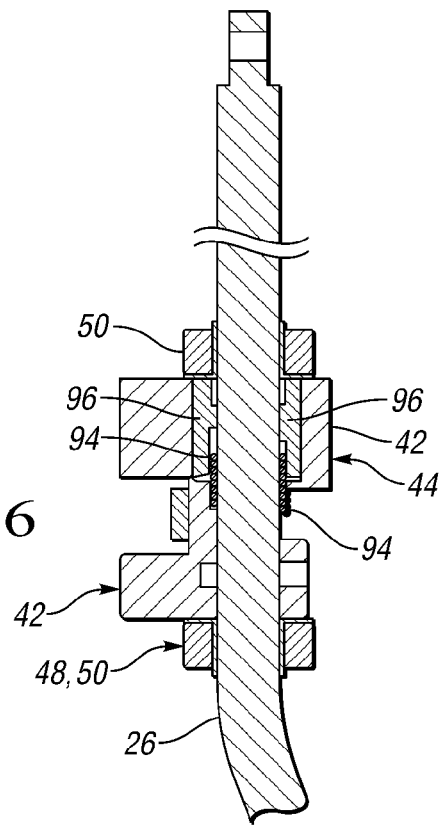
FIG. 15
FIG. 16

VEHICLE SEAT HEADREST ASSEMBLY HAVING VERTICAL AND LONGITUDINAL ADJUSTMENT

CROSS-REFERENCE TO RELATED APPLICATIONS

This application claims the benefit of U.S. provisional Application Ser. No. 61/664,902 filed on Jun. 27, 2012 by Robert L. Haeske, Karl A. Murphy and Edward H. Poulos under the title VEHICLE SEAT HEADREST HAVING VERTICAL AND LONGITUDINAL ADJUSTMENT.

TECHNICAL FIELD

This invention relates to a vehicle seat headrest assembly having headrest vertical and longitudinal adjustment and having locking clamps for preventing downward and rearward movement during use.

BACKGROUND

Vehicle seats have previously included headrests that are adjustable vertically and longitudinally to provide the most effective head support.

Prior art noted during searching conducted in connection with the present invention include U.S. patents/Published applications: U.S. Pat. No. 5,052,754 Chinomi; U.S. Pat. No. 6,149,233 Takei et al.; U.S. Pat. No. 6,213,548 Van Wynsberghe et al.; U.S. Pat. No. 6,533,359 Holstensson; U.S. Pat. No. 6,666,516 Grammss et al.; U.S. Pat. No. 6,688,697 Baumann et al.; U.S. Pat. No. 6,899,395 Yetukuri et al.; U.S. Pat. No. 6,983,995 Veine et al.; U.S. Pat. No. 7,073,856 Akaike et al.; U.S. Pat. No. 7,073,863 Low et al.; U.S. Pat. No. 7,232,187 Sundararajan et al.; U.S. Pat. No. 7,284,793 Klühspies et al.; U.S. Pat. No. 7,350,859 Klukowski; U.S. Pat. No. 7,455,363 Chung; U.S. Pat. No. 7,500,721 Beroth et al.; U.S. Pat. No. 7,517,015 Terada et al.; U.S. Pat. No. 7,520,564 Woerner; U.S. Pat. No. 7,611,196 Terada et al.; U.S. Pat. No. 7,618,091 Akaike et al.; U.S. Pat. No. 7,631,932 Hoffmann; U.S. Pat. No. 7,717,507 Toda et al.; U.S. Pat. No. 7,766,423 Alexander et al.; U.S. Pat. No. 7,770,967 Hirota et al.; U.S. Pat. No. 7,866,745 Hirota et al.; U.S. Pat. No. 7,871,129 Boes et al.; 2004/0262974 Terada et al.; 2007/0027599 Sakai et al.; 2007/0246989 Brockman; 2008/0100118 Young et al.; 2009/0058162 Boes et al.; 2009/0096468 Hirota et al.; 2010/0026061 McFalls et al.; 2010/0127541 Kotz; 2010/0127548 Truckenbrodt et al.; 2010/0231023 Wuerstlein et al.; 2010/0283306 Boes et al.; and 2011/0109143 Maddelein et al.

SUMMARY

An object of the present invention is to provide an improved vehicle seat headrest assembly.

In carrying out the above object, the invention a vehicle seat headrest assembly constructed according to the invention includes a pair of vertical supports for extending upwardly from a vehicle seat back in a laterally spaced relationship from each other with respect to the seat back. A headrest of the assembly includes a rear headrest portion and a front headrest portion, with the rear headrest portion mounted on the seat back by the pair of vertical supports for vertical movement, and with a linkage that supports the front headrest portion on the rear headrest portion for longitudinal movement in forward and rearward directions with respect to the seat back. A rack and pinion mechanism of the rear headrest portion includes a pair of racks and a pinion meshed with the pair of racks, and the pair of racks are connected to the linkage to control movement of the linkage and hence the longitudinal movement of the front headrest portion on the rear headrest portion. A first helical spring locking clamp of the headrest portion includes a first helical spring that extends around one of the vertical supports and is wound in a direction to permit upward movement of the headrest for adjustment while preventing downward movement of the headrest. A second helical spring locking clamp of the headrest includes a second helical spring that is wound around the pinion of the rack and pinion mechanism in a direction to allow its rotation for permitting linkage movement for forward movement of the front headrest portion on the rear headrest portion while preventing its rotation in an opposite direction for linkage movement for rearward movement of the front headrest portion on the rear headrest portion. An actuator of the headrest releases the first and second helical spring locking clamps to permit downward movement of the headrest for adjustment and rearward movement of the front headrest portion on the rear headrest portion for adjustment.

As disclosed, the actuator includes a release button that releases both the first and second helical spring locking clamps at the same time to simultaneously permit both the downward movement of the headrest for adjustment and the rearward movement of the front headrest portion on the rear headrest portion for adjustment.

The rear headrest portion disclosed includes a support bridge extending from each of the pair of vertical supports to the other and supporting the rack and pinion mechanism, and the linkage includes a pair of support levers having associated first ends respectively supported for pivoting about the pair of vertical supports and also having associated second ends spaced from their first ends. Furthermore, the linkage disclosed also includes a pair of control levers having first ends pivotally connected to the front headrest portion and having second ends respectively pivotally connected to the pair of racks of the rack and pinion mechanism as well as having intermediate portions respectively pivotally connected to the second ends of the pair of support levers.

A support beam of the headrest as disclosed extends between the pair of vertical supports at a location above the support bridge, with the support bridge having one end that supports the first helical spring locking clamp with its helical spring extending around the one vertical support, and with the support bridge also having an intermediate portion that mounts the rack and pinion mechanism and that also supports the second helical spring locking clamp with its helical spring extending around the pinion of the rack and pinion mechanism. The support bridge has a rear side at which the intermediate portion of the support bridge mounts the rack and pinion mechanism and a front side at which the support bridge mounts the second helical spring locking clamp, and the pinion of the rack and pinion mechanism has a rod that projects forwardly from the rear side of the support bridge to its front side to the second helical spring locking clamp which provides locking and release of the pinion for rotation.

As disclosed, the actuator includes a release button mounted on the front headrest portion and also includes an actuator member mounted on the support bridge, and in one embodiment the actuator includes a telescopic connector that operates the actuator member on the support bridge by the release button on the front headrest portion to release both helical spring locking clamps. In another embodiment, the actuator includes a release cable that releases both helical locking clamps.

The friction of the front headrest portion can be tuned so the front headrest will move forwardly at a predetermined rate of deceleration to provide head support to a vehicle seat occupant, and the threshold level of deceleration that permits the forward movement of the headrest can be controlled by suitable adjustment such as by one or more adjusters that control the friction involved with the forward movement of the front headrest portion and/or by the weight of the front headrest portion.

In carrying out the above object, a vehicle seat headrest assembly constructed according to the invention includes a pair of vertical supports for extending upwardly from a vehicle seat back in a laterally spaced relationship from each other with respect to the seat back, a headrest including a rear headrest portion and a front headrest portion, with the rear headrest portion mounted on the seat back by the pair of supports for vertical movement, with a linkage and a rack and pinion mechanism that support the front headrest portion on the rear headrest portion and control longitudinal movement of the front headrest portion in forward and rearward directions with respect to the rear headrest portion, with a first locking clamp that permits upward movement of the headrest for adjustment while preventing downward movement of the headrest, with a second locking clamp that permits linkage movement and operation of the rack and pinion mechanism for forward movement of the front headrest portion on the rear headrest portion while preventing linkage movement and rack and pinion mechanism operation for rearward movement of the front headrest portion on the rear headrest portion, with an actuator for releasing the first and second helical spring locking clamps to permit downward movement of the headrest for adjustment and rearward movement of the front headrest portion on the rear headrest portion for adjustment, and with the friction of the headrest being tuned so the front headrest will move forwardly at a predetermined rate of deceleration to provide head support to a vehicle seat occupant.

BRIEF DESCRIPTION OF THE DRAWINGS

FIG. 2 is another perspective view of the headrest assembly with a rear headrest portion housing of the headrest removed to illustrate the manner in which the front headrest portion is supported and as illustrated is shown in a rear position.

FIG. 15 is a perspective view illustrating a helical spring locking clamp that controls vertical movement of the headrest.

FIG. 16 is a vertical sectional view taken along the direction of line 16-16 in FIG. 15 to further illustrate the helical spring locking clamp that controls the vertical headrest movement.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
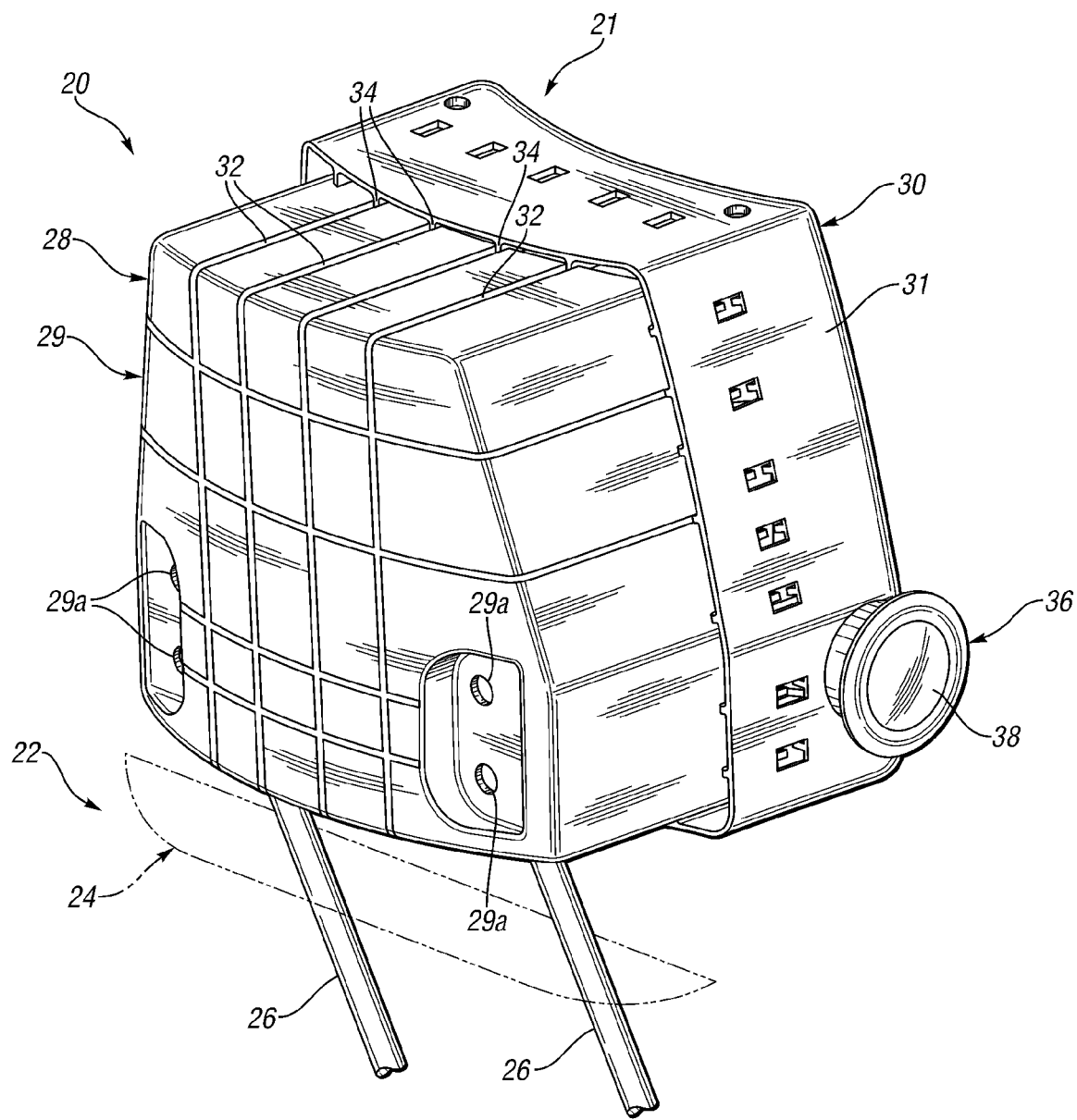
FIG. 1 is a perspective view of a vehicle seat headrest assembly constructed according to the present invention.

With reference to FIG. 1, a vehicle seat headrest assembly embodying the invention is generally indicated by 20 and includes a headrest 21 mounted on a vehicle seat 22 at the upper extremity of its seat back 24 by a pair of vertical supports 26 of the assembly. The headrest 21 includes a rear headrest portion 28 having a housing 29 mounted on the vertical supports 26 for vertical movement as is hereinafter described and also includes a front headrest portion 30 having a housing 31 that is movable in a longitudinal direction forwardly and rearwardly on the rear headrest portion as is also hereinafter described. Holes 29a in the housing 29 of the rear headrest portion 30 receive screws or the like to provide its mounting. Both housings 29 and 31 of the rear and front headrest portions 28 and 30 as disclosed are molded from a suitable plastic and the front headrest portion may have an upholstery cover where the occupant's head contacts the headrest for support. Longitudinal grooves 32 in the exterior of the rear headrest housing 29 receive longitudinal ribs 34 in the interior of the front headrest housing 31 to support the front headrest portion 30 on the rear headrest portion 28 for the longitudinal adjusting movement that is hereinafter more fully described. The headrest 21 can normally be moved upwardly but is prevented from downward movement and its front headrest portion 30 can normally be moved longitudinally in a forward direction but is prevented from rearward movement in the longitudinal direction. An actuator 36 disclosed as a push button 38 provides actuation that releases the headrest 21 for downward movement on the vertical supports 26 and also releases the front headrest portion 30 for rearward longitudinal movement on the rear headrest portion 28.

Figure 2:
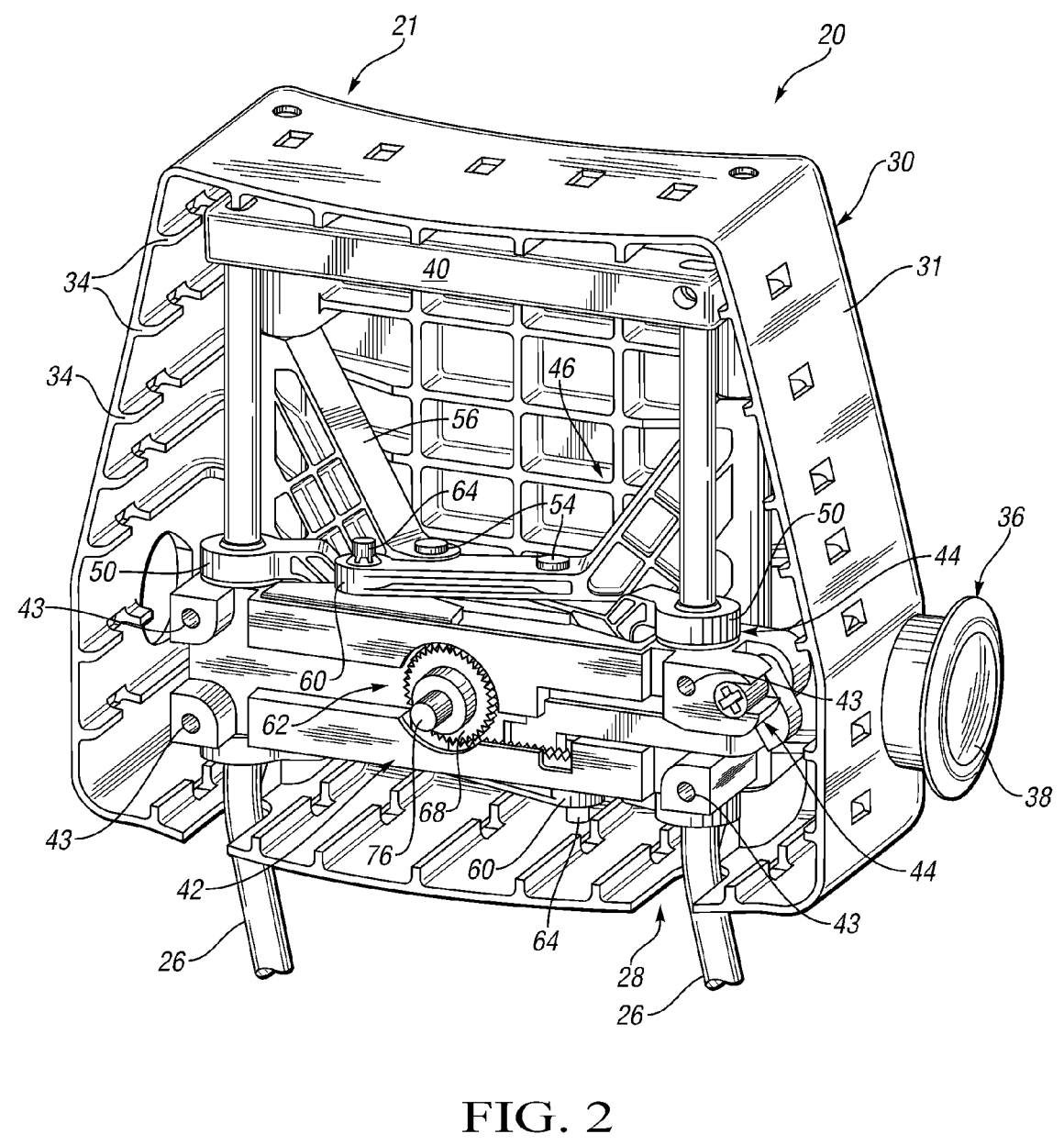
Figure 3:
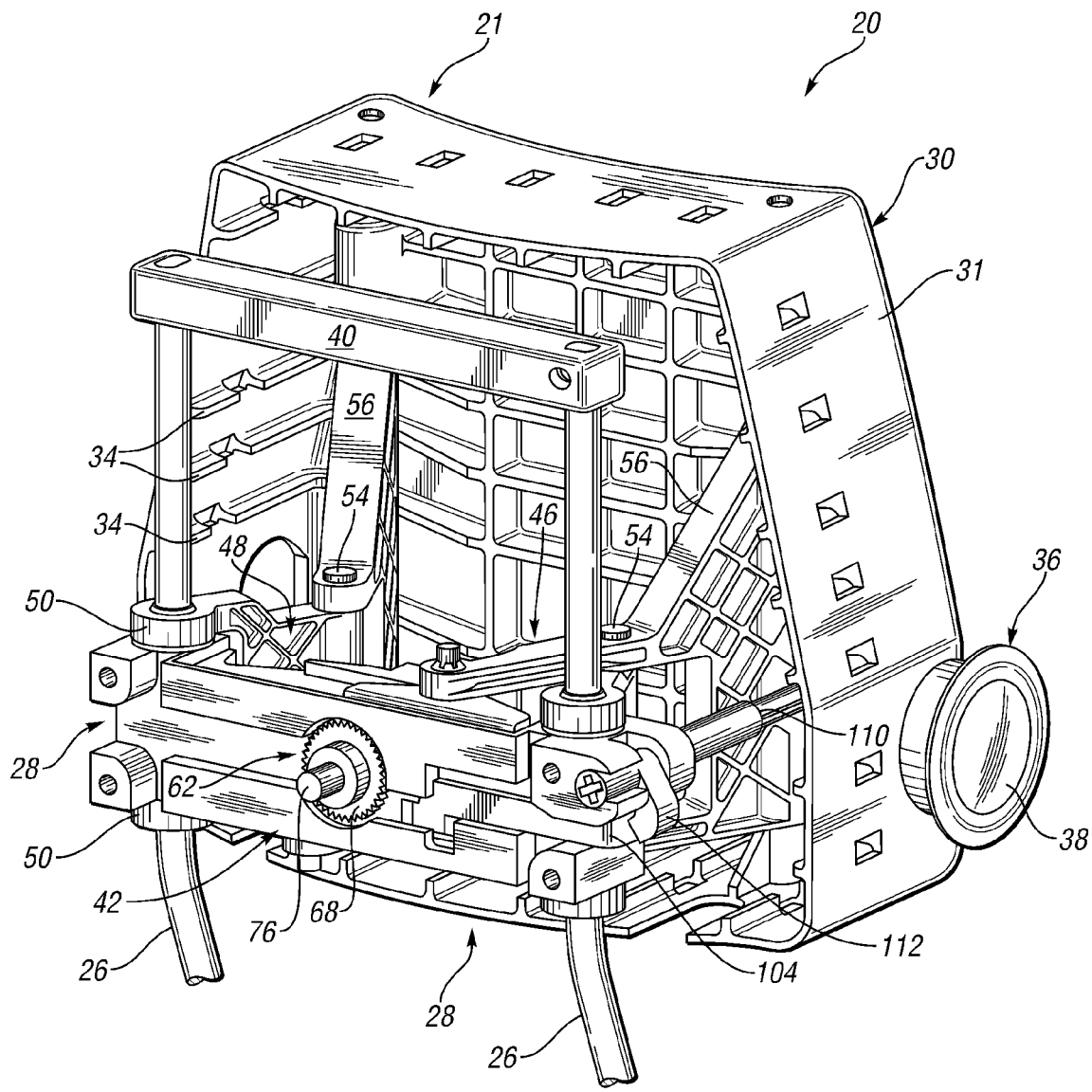
FIG. 3 is a perspective view similar to FIG. 2 but with the front headrest portion in a forward position.

In FIG. 2, the housing of the rear headrest portion 28 is removed to illustrate the manner in which the front headrest portion 30 is mounted for its longitudinal movement from the rearwardmost position shown to the forwardmost position shown in a similar view in FIG. 3. Within the headrest, a support beam 40 extends between the upper extremities of the vertical supports 26 and a support bridge 42 of the rear headrest portion 28 extends between the vertical supports below the support beam 40 and is movable vertically on the vertical supports 26 to move the headrest vertically. The support bridge 42 includes holes 43 that receive the screws for supporting the housing of the rear headrest portion 28. A first helical spring locking clamp 44 that is hereinafter more fully described clamps onto the right vertical support 26 as illustrated in FIGS. 2 and 3 to normally prevent downward movement of the headrest while allowing upward movement for adjustment. Depression of the push button 38 of actuator 36 releases this clamp 44 to also permit downward movement from any upper position as is also hereinafter more fully described.

Figure 4:
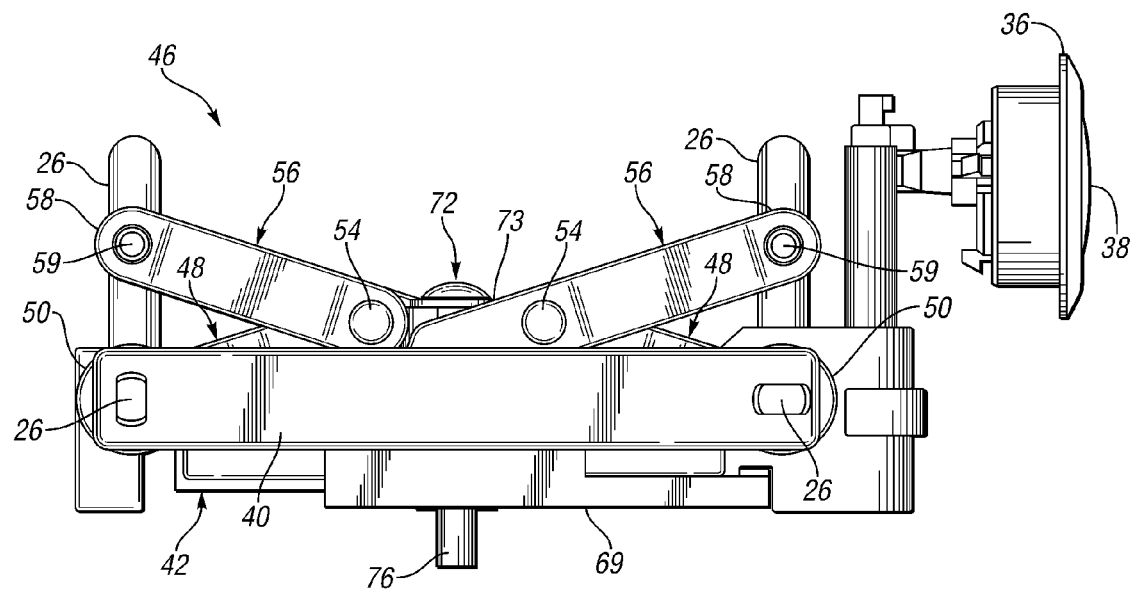
FIG. 4 is a top plan view illustrating a linkage of the headrest for supporting the front headrest portion on the rear headrest portion for forward and rearward movement and is illustrated in a rearward position.
Figure 5:
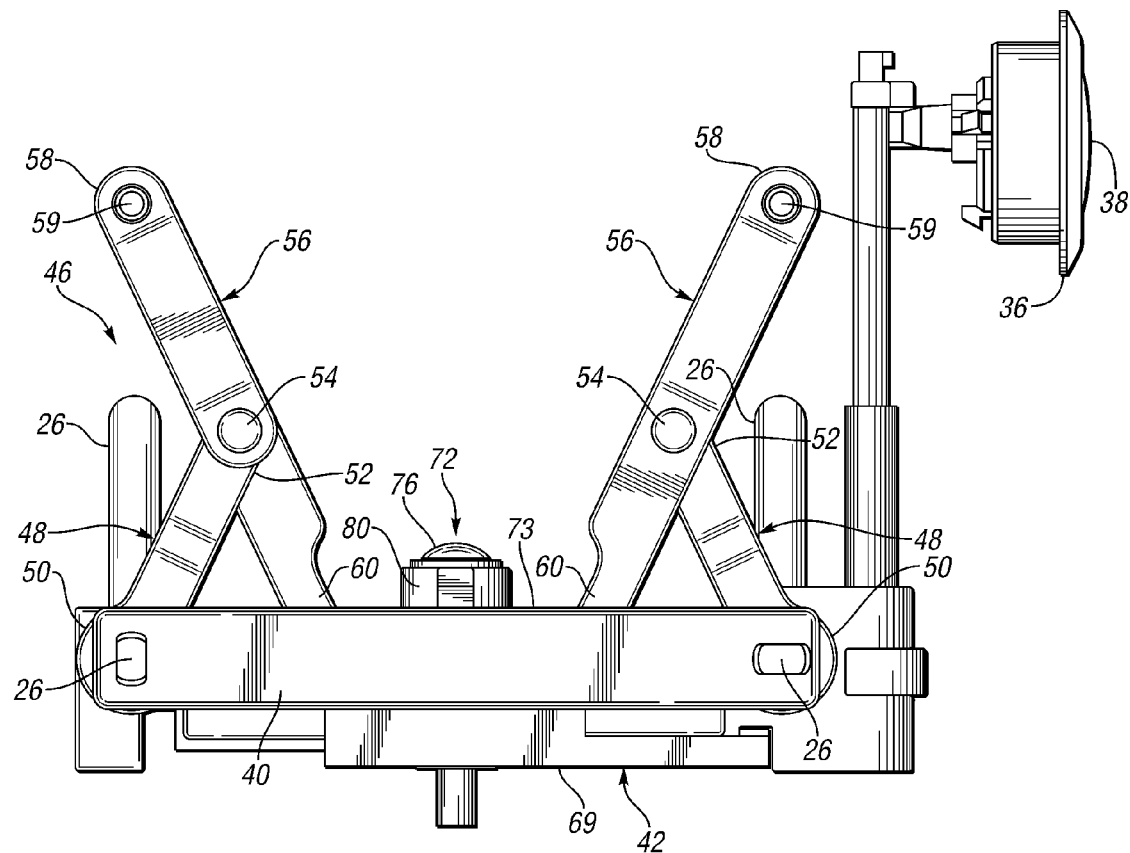
FIG. 5 is a top plan view similar to FIG. 4 but showing the linkage supporting the headrest in a forward position.

As illustrated in FIGS. 2-5, a support linkage generally indicated by 46 supports the housing 31 of the front headrest portion 30 on the support bridge 42 of the rear headrest portion for movement between the rearward position shown in FIGS. 2 and 4 and the forward position shown in FIGS. 3 and 5. More specifically, the support linkage 46 includes a pair of support levers 48 having first ends 50 that are respectively pivotally supported on the support bridge 42 at the vertical supports 26 for pivotal movement between the rearward position shown in FIG. 4 and the forward position shown in FIG. 5. Support levers 48 also have second ends 52 including pivotal connections 54 to respective intermediate portions of control levers 56 which have first ends 58 with pivotal connections 59 that support the front headrest housing 31 and provide its longitudinal movement between the forward and rearward positions. These control levers 56 have second ends 60 that extend to a rack and pinion mechanism 62 mounted on the support bridge 42 that extends between the vertical supports 26 as previously discussed. More specifically, the left control lever 56 as shown in FIGS. 4 and 5 has its second end 60 provided with a pivotal connection 64 to the lower side of the rack and pinion mechanism as shown in FIGS. 2 and 3, and the right control link 56 shown in FIGS. 4 and 5 has its second end 60 with a pivotal connection 64 at the upper side of the rack and pinion mechanism 62 as shown in FIGS. 2 and 3.

Figure 6A:
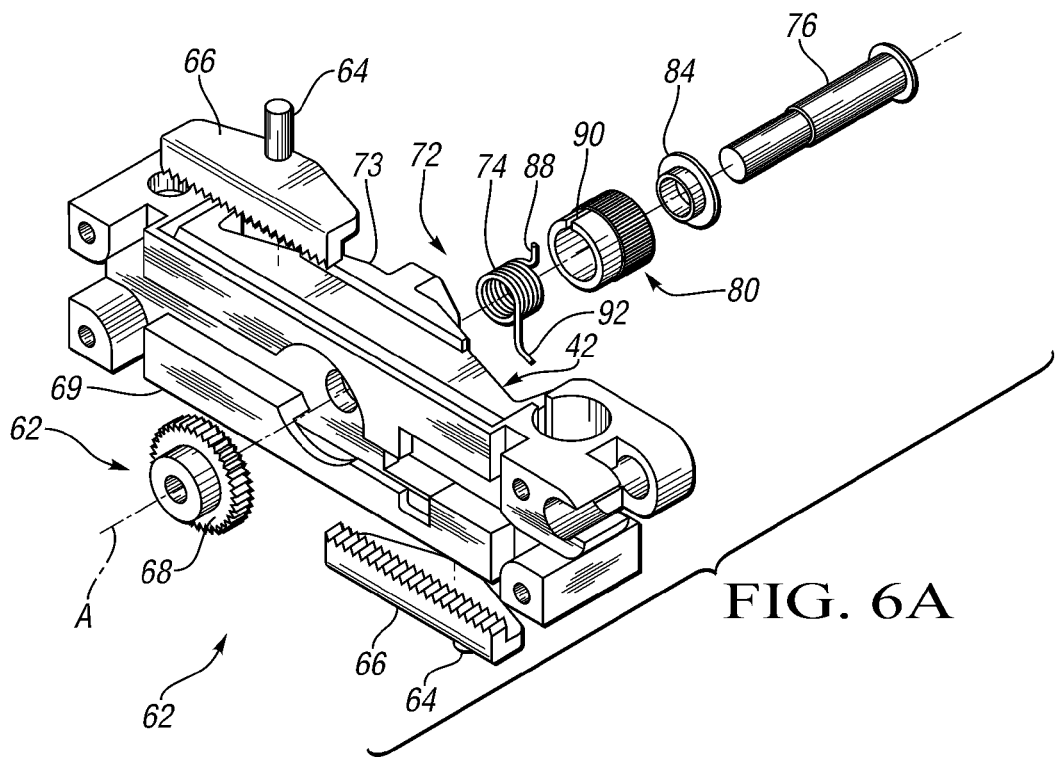
FIGS. 6A and 6B are exploded perspective views illustrating a rack and pinion mechanism of the headrest and a helical spring locking clamp that normally prevents rearward movement of the front headrest portion but is releasable to permit such front headrest portion rearward movement for adjustment.
Figure 6B:
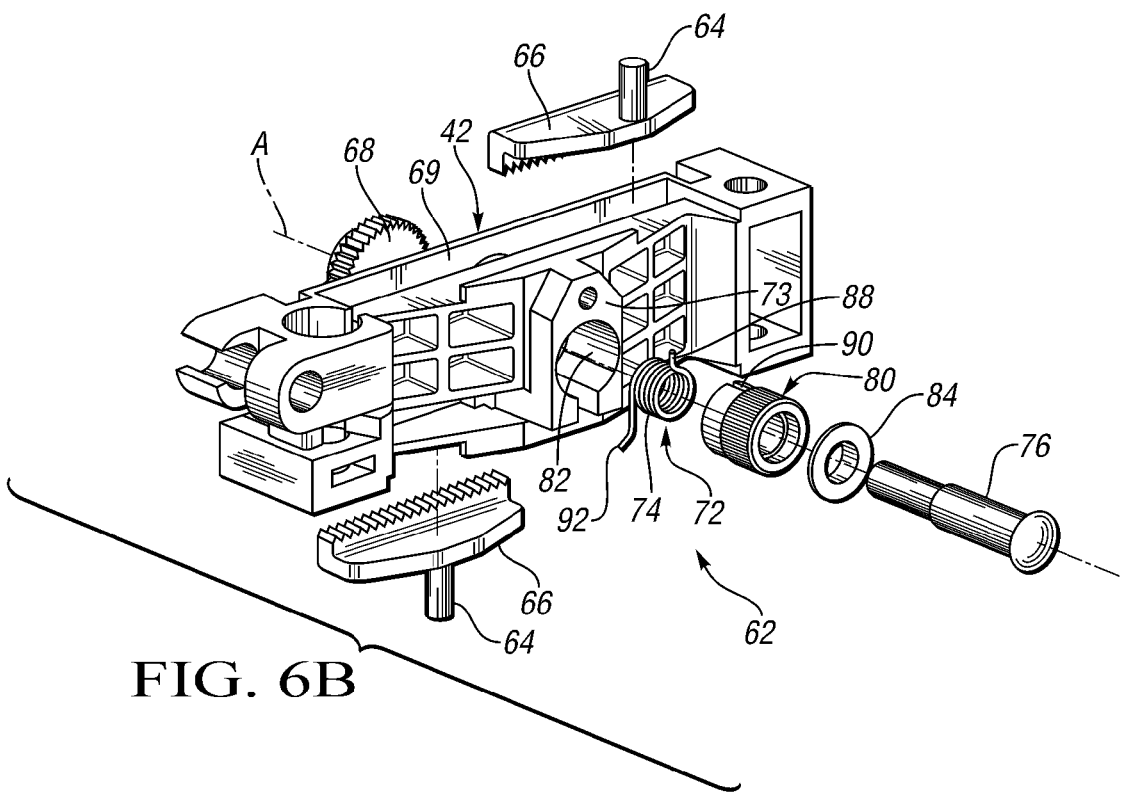
Figure 9:
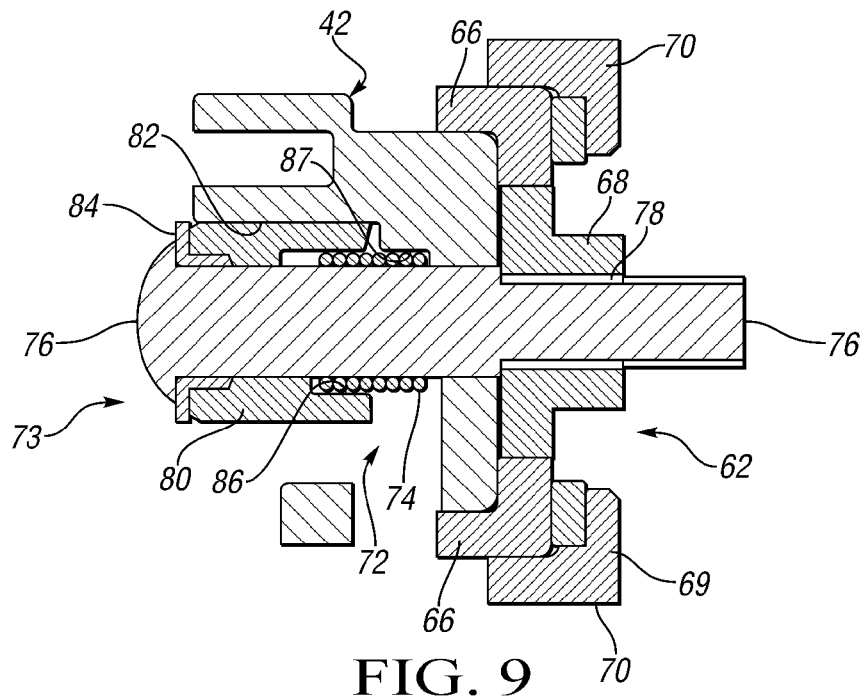
FIG. 9 is a sectional view taken along the direction of line 9-9 in FIG. 7 through the rear headrest portion at a support bridge thereof that extends between the vertical supports of the headrest assembly.

As illustrated by FIGS. 6A and 6B, the rack and pinion mechanism 62 includes lower and upper rack members 66 that are slidably supported on the support bridge 42 and have rack teeth that mesh with a toothed pinion 68 rotatably supported about an axis A on the support bridge 42 at its rear side 69 as shown. Lower and upper retainers 70 respectively maintain the meshing relationship of the rack members 66 with the pinion 68 as illustrated in FIG. 9. Involute tooth faces on the rack and pinion teeth reduce backlash to provide better positioning of the front headrest portion. The rack members 66 as shown in the views of FIGS. 6A and 6B have pin portions of the pivotal connections 64 that respectively connect to the second ends 60 of the control levers 56 such that the rack and pinion mechanism 62 by the support levers 48 and control levers 56 synchronize the linkage 46 that supports the front headrest portion 30 and moves it relative to the rear headrest portion 28 between its forward and rearward positions.

Figure 7:
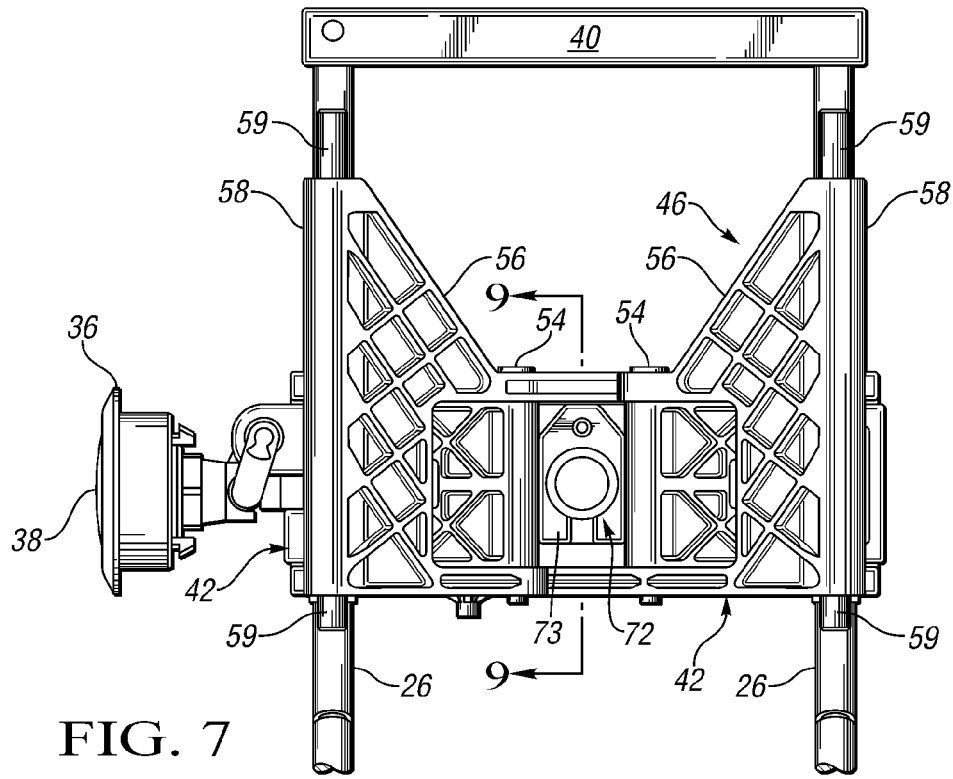
FIG. 7 is an elevational view looking rearwardly at the headrest linkage.

With reference to the views of FIGS. 6A and 6B and to FIG. 7, a second helical spring locking clamp 72 is supported on a front side 73 of the support bridge 42 and includes a helical spring 74 for providing clamping against operation of the rack and pinion mechanism 62. More specifically, the pinion 68 of the rack and pinion mechanism 62 includes a headed rod 76 that has a connection 78 so as to rotate with the pinion and that extends forwardly through the support bridge 42 to the clamp 72 on the front side 73 of the support bridge 42. A bushing 80 of clamp 72 is press fitted into an opening 82 in the support bridge 42 so as to be rotatively fixed with respect thereto and a bushing 84 between the head of the rod 76 and the bushing 80 permits rotation of the rod under the control of the helical spring 74 of clamp 72. A helical ramp 86 on the bushing 80 and a helical ramp 87 on the support bridge 42 respectively set the adjacent ends of the spring 74, and one end of spring 74 as shown in the FIG. 6A has a radially extending distal end 88 received within an axial slot 90 of bushing 80 to prevent rotation of the spring. The spring 74 is wound so that the rod 76 and pinion 68 can rotate so as to permit the rack and pinion movement corresponding to forward longitudinal movement of the front headrest portion 30 but to prevent rotation of the rod 76 and pinion 68 in the opposite direction so that the front headrest portion 30 cannot move in a rearward longitudinal direction. An end 92 of helical spring 74 shown in FIGS. 6A and 6B is moved by the operation of the actuator 36 shown in FIGS. 1-3 to unclamp the spring 74 from rod 76 and thereby permit adjusting rearward movement of the front headrest portion 30 as the pinion 68 rotates to permit such movement by movement of the control levers 56 connected to support levers 48 and to the rack and pinion mechanism 62 as previously described.

Figure 8:
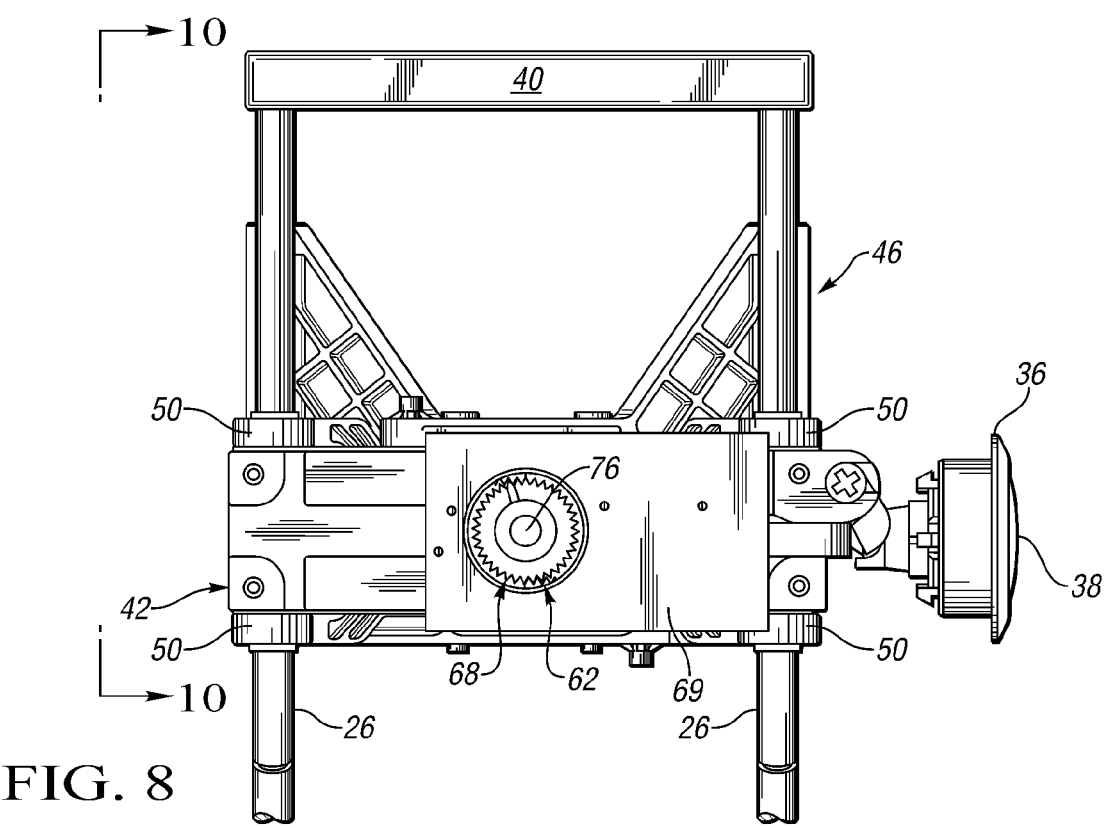
FIG. 8 is an elevational view looking forwardly at the headrest linkage.

FIGS. 7 and 8 are respectively rearwardly and forwardly facing elevational views illustrating the support bridge 42 and the support and control levers 48 and 56 in a lower position. As previously mentioned, the support bridge 42 can be moved upwardly at any time but requires operation of the actuator 36 for downward movement, which actuator operation as discussed also permits the movement of the front headrest portion 30 in a rearward longitudinal direction in addition to the forward longitudinal movement that can be done at any time.

Figure 10:
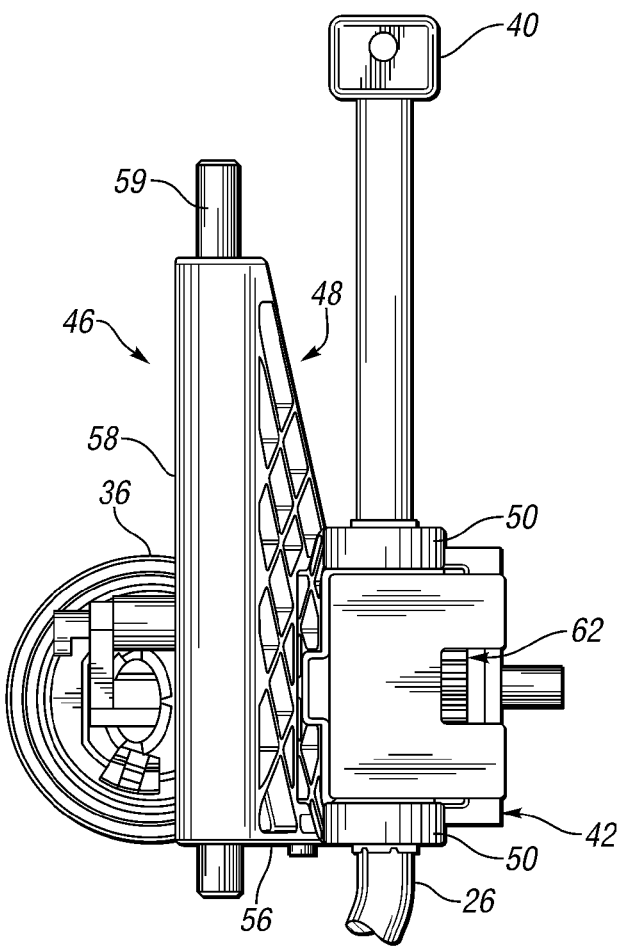
FIG. 10 is a side elevational view of the support bridge and linkage taken along the direction of line 10-10 in FIG. 8 and shown with the headrest in a lower position.

FIG. 10 is a side view taken along the direction of line 10-10 in FIG. 8 and shows the control levers 56 in their full rearward position and the support bridge 42 in its lowest position.

Figure 11:
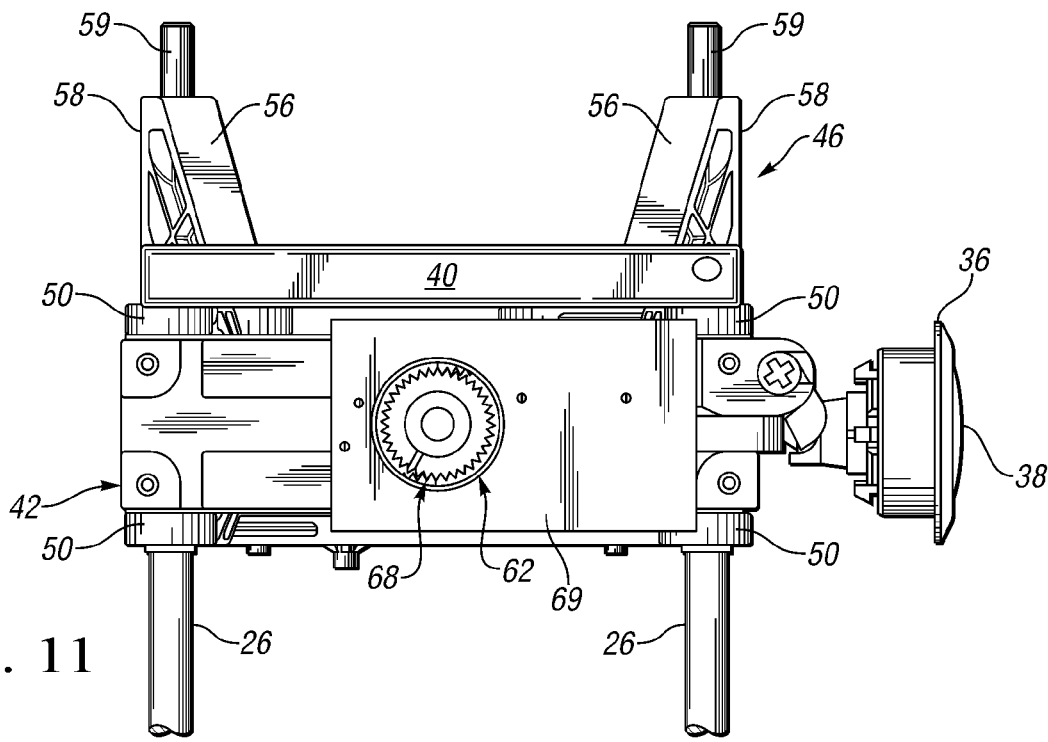
FIG. 11 is a view similar to FIG. 8 but shown with the support bridge moved upwardly to an upper position.

FIG. 11 is a view taken in the same direction as FIG. 8 showing the support bridge 42 and the rack and pinion mechanism 62 in the upper position from which downward movement is only possible by operation of the actuator 36.

Figure 12:
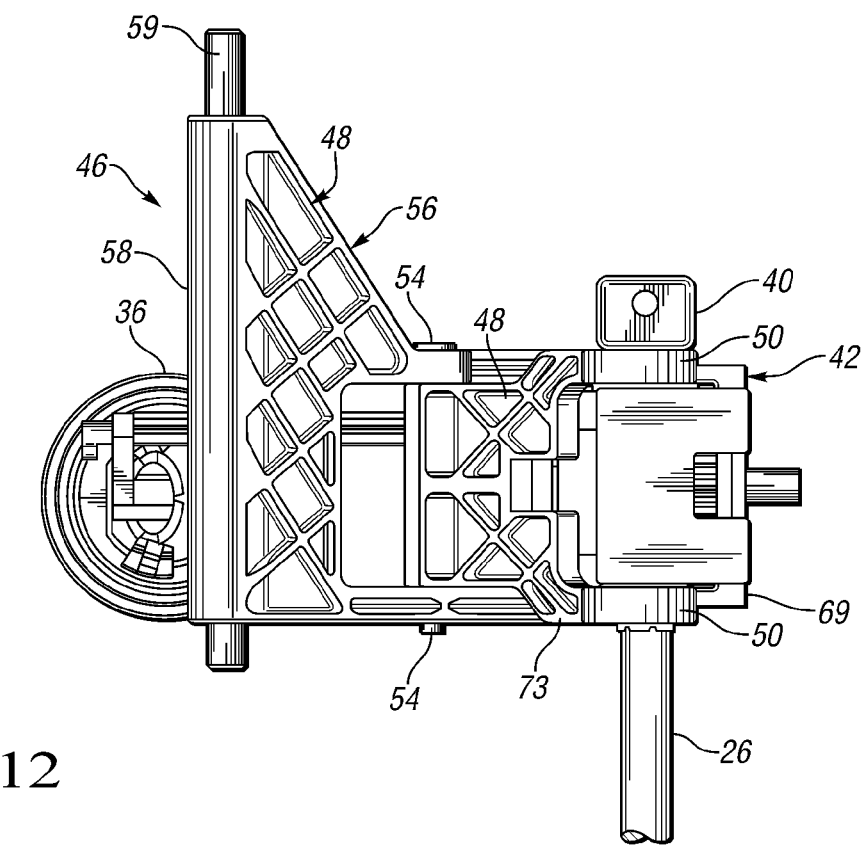
FIG. 12 is a side view of the linkage and support bridge similar to FIG. 10 but like FIG. 11 shown in an upper position.

FIG. 12 is a side view taken in the same direction as FIG. 10 but showing the support bridge 42 in its upper position and showing the support linkage 46 positioned to support the front headrest portion in its forward position, from which downward movement of the support bridge 42 and entire headrest 21 and the rearward movement of the front headrest portion are only possible by operation of the actuator 36.

Figure 13:
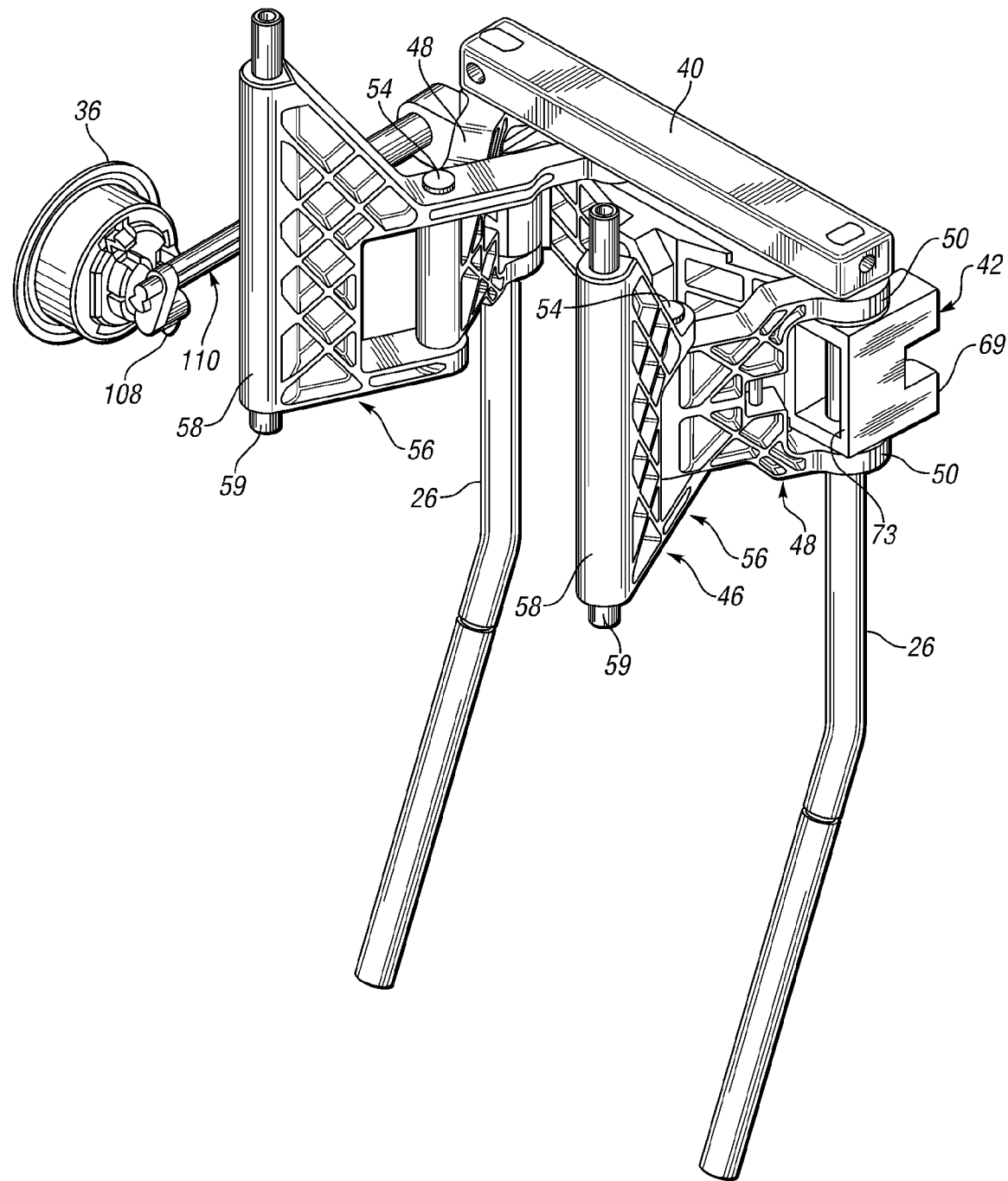
FIG. 13 is a perspective view of the linkage assembly shown with the support bridge in the upper position and positioned to support the front headrest portion in its forward and upper location.

FIG. 13 is a perspective view of the vertical supports 26 supporting the support bridge 42 in its upper position and showing the support linkage 46 positioned to support the front headrest portion in its forward position, from which downward movement of the support bridge and rearward movement of the front headrest portion require operation of the actuator 36

Figure 14:
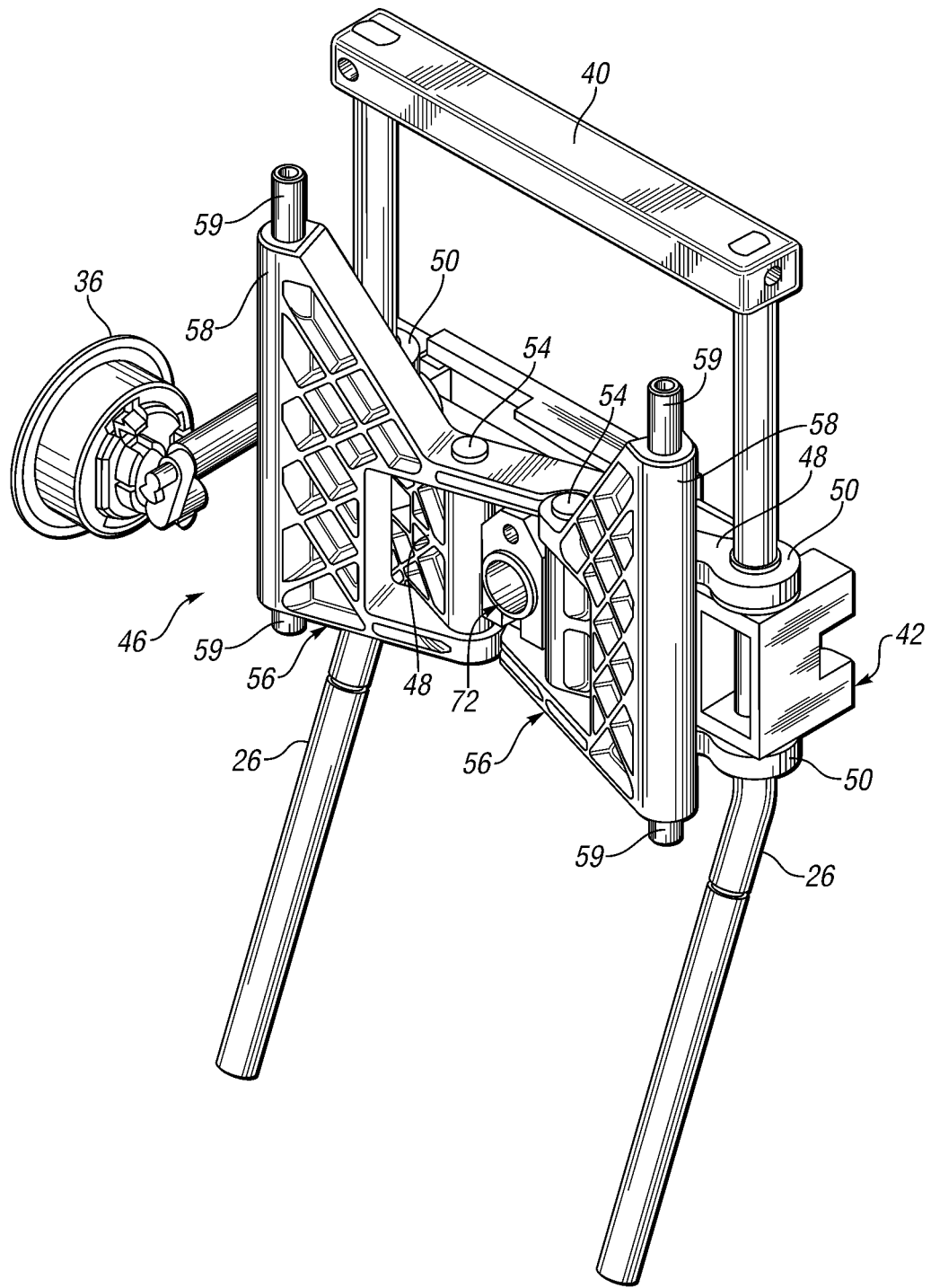
FIG. 14 is also a perspective view taken in the same direction as FIG. 13 but with the linkage positioned to support the front headrest portion in its rear position and with the support bridge in a lower position so the headrest is in its lower position.

FIG. 14 is a view similar to FIG. 13 but shown with the support bridge 42 in its lowest position and the linkage 46 in its rearward position to which movement is only possible from the FIG. 13 position by operation of the actuator 36.

FIG. 15 is a perspective view illustrating the construction of the helical spring locking clamp 44 that controls vertical movement of the support bridge 42 on the vertical supports 26 by clamping to the vertical support illustrated.

FIG. 16 is an elevational view taken in section along the direction of line 16-16 in FIG. 15 through the helical clamp 44 to further illustrate its construction.

As illustrated in FIGS. 15 and 16, the helical spring locking clamp 44 includes a helical spring 94 for clamping around the associated vertical support post 26. The helical spring 94 is received within a bushing 96 that is press fitted into an opening 98 in the support bridge 42. This bushing 96 has a helical ramp that seats the upper end of the helical spring 94 and also has an axial slot 100 as shown in FIG. 15 that receives a radially extending distal end 102 of the helical spring 94 so as to prevent spring rotation. The spring is wound so as to permit upward movement on the associated vertical support 26 but to prevent downward movement without operation of the actuator 36.

The headrest actuator 36 shown in FIGS. 1-5 and 10-14 includes an actuator member 104 as shown in FIG. 15, that is movable along the support bridge 42 and has a first actuator portion 106 that moves a spring end 105 of the helical spring 94 of the first clamp 44 upon such spring and movement in order to permit downward movement of the support bridge 42 and the entire headrest on the vertical supports 26. The actuator member 104 also includes a second actuator portion 107 that extends along the support bridge 42 in its assembled position to the second clamp 72 shown in FIG. 9 to move the end 92 of spring 74 shown in FIGS. 6A and 6B in order to allow the rearward movement of the front headrest portion by releasing the clamp 72. Thus both the vertical clamp 44 and longitudinal clamp 72 are released at the same time by the movement of the actuator member 104 to permit adjusting movement of the entire headrest 21 vertically downward and movement of the front headrest portion 30 longitudinally toward the rear.

The operation of the actuator member 104 shown in FIG. 15 is provided by operation of the push button 38 of actuator 36. More specifically, as shown in FIG. 13, this depression of the push button of actuator 36 pivots a crank 108 that rotates one end of a telescopic connector 110 whose other end extends to a crank 112 on the support bridge 42 as shown in FIG. 3 to move the actuator member 104 and release both of the helical spring locking clamps 44 and 72 as previously described to permit downward movement of the entire headrest 21 and the rearward movement of the front headrest portion 30. The telescopic connector 110 includes two telescopic members that permit the longitudinal movement forwardly and rearwardly while still maintaining the rotational connection between the actuator 36 whose push button 38 provides the actuation of actuator member 104 through cranks 108 and 112.

Figure 17:
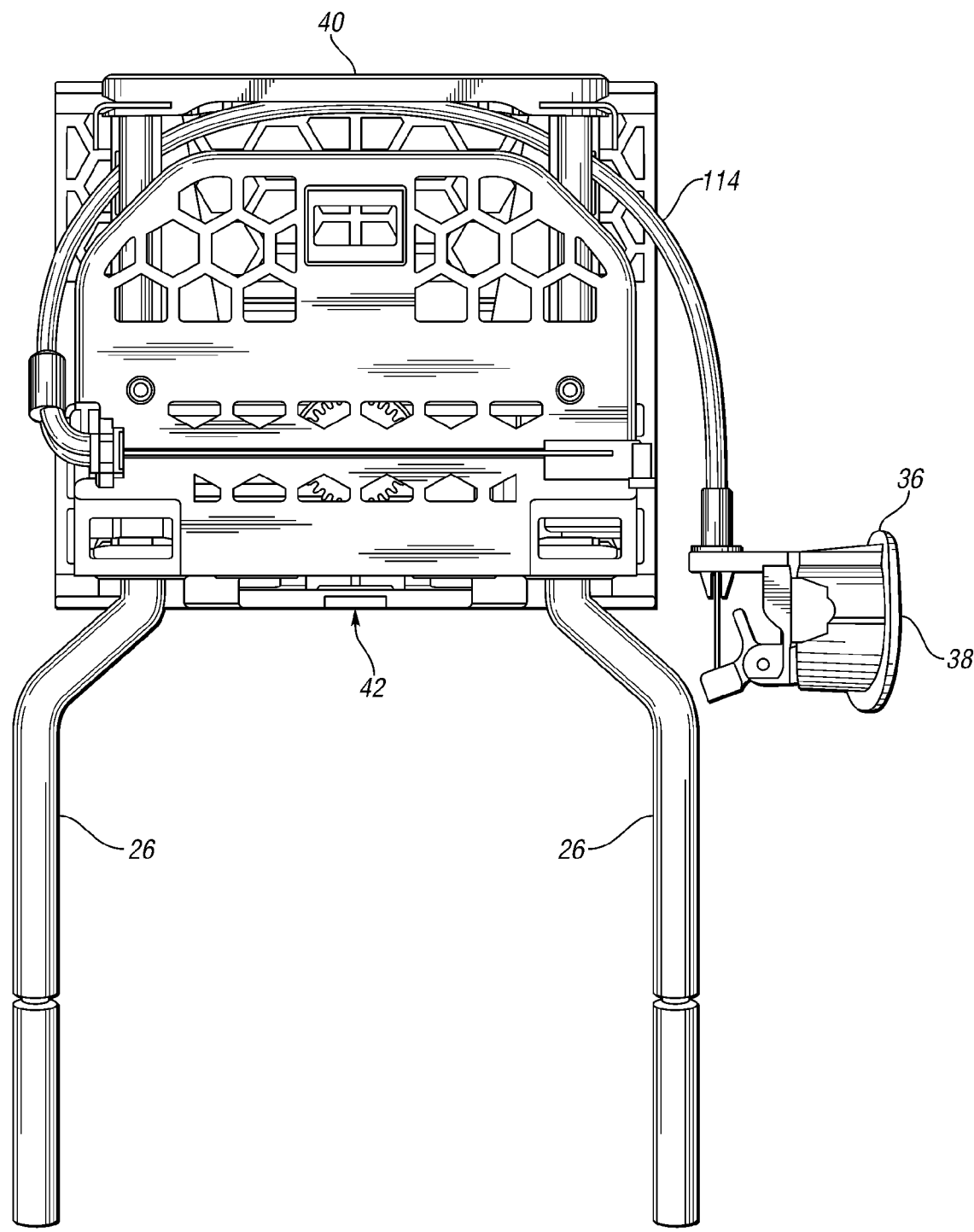
FIG. 17 is a view illustrating a flexible cable that actuates release of the locking clamps of the headrest.

As shown in FIG. 17, it is also possible for the actuator to release the helical spring locking clamps 44 and 72 by a release cable 114 that operates the actuator member 104 to release both of the helical spring locking clamps 44 and 72.

The friction of the headrest can be tuned so that at a predetermined rate of deceleration, the front headrest portion 30 will move forwardly to provide head support to a vehicle seat occupant. The threshold level of deceleration that permits this movement can also be controlled by suitable adjustment such as by one or more adjusters that control the friction involved with forward movement of the front headrest portion and/or the weight of the front headrest portion.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle seat headrest assembly comprising:
   a pair of vertical supports for extending upwardly from a vehicle seat back in a laterally spaced relationship from each other with respect to the seat back;
   a headrest including a rear headrest portion and a front headrest portion;
   the rear headrest portion being mounted on the seat back by the pair of vertical supports for vertical movement;
   a linkage that supports the front headrest portion on the rear headrest portion for longitudinal movement in forward and rearward directions with respect to the seat back;
   a rack and pinion mechanism of the rear headrest portion including a pair of racks and a pinion meshed with the pair of racks, and the pair of racks being connected to the linkage to control movement of the linkage and hence the longitudinal movement of the front headrest portion on the rear headrest portion;
   a first helical spring locking clamp including a first helical spring that extends around one of the vertical supports and is wound in a direction to permit upward movement of the headrest for adjustment while preventing downward movement of the headrest;
   a second helical spring locking clamp including a second helical spring that is wound around the pinion of the rack and pinion mechanism in a direction to allow its rotation for permitting linkage movement for forward movement of the front headrest portion on the rear headrest portion while preventing its rotation in an opposite direction for linkage movement for rearward movement of the front headrest portion on the rear headrest portion; and
   an actuator for releasing the first and second helical spring locking clamps to permit downward movement of the headrest for adjustment and rearward movement of the front headrest portion on the rear headrest portion for adjustment.

2. A vehicle seat headrest assembly as in claim 1 wherein the actuator includes a release button that releases both the first and second helical spring locking clamps at the same time to simultaneously permit both the downward movement of the headrest for adjustment and the rearward movement of the front headrest portion on the rear headrest portion for adjustment.

3. A vehicle seat headrest assembly as in claim 1 wherein the rear headrest portion includes a support bridge extending from each of the pair of vertical supports to the other and supporting the rack and pinion mechanism, the linkage including a pair of support levers having associated first ends respectively supported for pivoting about the pair of vertical supports and also having associated second ends spaced from their first ends, and the linkage further including a pair of control levers having first ends pivotally connected to the front headrest portion and having second ends respectively pivotally connected to the pair of racks of the rack and pinion mechanism as well as having intermediate portions respectively pivotally connected to the second ends of the pair of support levers.

4. A vehicle seat headrest assembly as in claim 3 further including a support beam extending between the pair of vertical supports at a location above the support bridge, the support bridge having one end that supports the first helical spring locking clamp with its helical spring extending around the one vertical support, and the support bridge also having an intermediate portion that mounts the rack and pinion mechanism and that also supports the second helical spring locking clamp with its helical spring extending around the pinion of the rack and pinion mechanism.

5. A vehicle seat headrest assembly as in claim 4 wherein the support bridge has a rear side at which the intermediate portion of the support bridge mounts the rack and pinion mechanism, the support bridge having a front side at which the support bridge mounts the second helical spring locking clamp, and the pinion of the rack and pinion mechanism having a rod that projects forwardly from the rear side of the support bridge to its front side to the second helical spring locking clamp which provides locking and release of the pinion for rotation.

6. A vehicle seat headrest assembly as in claim 3 wherein the actuator includes a release button mounted on the front headrest portion and also includes an actuator member mounted on the support bridge, and the actuator including a telescopic connector that operates the actuator member on the support bridge by the release button on the front headrest portion to release both helical spring locking clamps.

7. A vehicle seat headrest assembly as in claim 3 wherein the actuator includes a release button mounted on the front headrest portion and also includes an actuator member mounted on the support bridge, and the actuator including a release cable that releases both helical locking clamps.

8. A vehicle seat headrest assembly as in claim 1 wherein the friction of the front headrest portion is tuned so the front headrest will move forwardly at a predetermined rate of deceleration to provide head support to a vehicle seat occupant.

9. A vehicle seat headrest assembly as in claim 8 wherein a threshold level of deceleration that permits the forward movement of the headrest can be controlled by suitable adjustment such as by one or more adjusters that control the friction involved with the forward movement of the front headrest portion and/or by the weight of the front headrest portion.

10. A vehicle seat headrest assembly comprising:
a pair of vertical supports for extending upwardly from a vehicle seat back in a laterally spaced relationship from each other with respect to the seat back;
a headrest including a rear headrest portion and a front headrest portion;
the rear headrest portion being mounted on the seat back by the pair of vertical supports for vertical movement;
a linkage that supports the front headrest portion on the rear headrest portion for longitudinal movement in forward and rearward directions with respect to the seat back;
a rack and pinion mechanism of the rear headrest portion including a pair of racks and a pinion meshed with the pair of racks, and the pair of racks being connected to the linkage to control movement of the linkage and hence the longitudinal movement of the front headrest portion on the rear headrest portion;
a first helical spring locking clamp including a first helical spring that extends around one of the vertical supports and is wound in a direction to permit upward movement of the headrest for adjustment while preventing downward movement of the headrest;
a second helical spring locking clamp including a second helical spring that is wound around the pinion of the rack and pinion mechanism in a direction to allow its rotation for permitting linkage movement for forward movement of the front headrest portion on the rear headrest portion while preventing its rotation in an opposite direction for linkage movement for rearward movement of the front headrest portion on the rear headrest portion; and
an actuator for releasing the first and second helical spring locking clamps to permit downward movement of the headrest for adjustment and rearward movement of the front headrest portion on the rear headrest portion for adjustment.

11. A vehicle seat headrest assembly comprising:
a pair of vertical supports for extending upwardly from a vehicle seat back in a laterally spaced relationship from each other with respect to the seat back;
a headrest including a rear headrest portion and a front headrest portion;
the rear headrest portion being mounted on the seat back by the pair of supports for vertical movement;
a linkage and a rack and pinion mechanism that support the front headrest portion on the rear headrest portion and control longitudinal movement thereof in forward and rearward directions with respect to the seat back;
a first helical spring locking clamp that permits upward movement of the headrest for adjustment while preventing downward movement of the headrest;
a second helical spring locking clamp that permits linkage movement and operation of the rack and pinion mechanism for forward movement of the front headrest portion on the rear headrest portion while preventing linkage movement and rack and pinion mechanism operation for rearward movement of the front headrest portion on the rear headrest portion;
an actuator for releasing the first and second helical spring locking clamps to permit downward movement of the headrest for adjustment and rearward movement of the front headrest portion on the rear headrest portion for adjustment; and
the friction of the headrest, which includes the second helical spring locking clamp controlling the operation of the rack and pinion mechanism, being tuned so the front headrest portion will move forwardly at a predetermined rate of deceleration to provide head support to a vehicle seat occupant.

* * * * *